(12) United States Patent
Kinoshita et al.

(10) Patent No.: US 8,621,013 B2
(45) Date of Patent: Dec. 31, 2013

(54) MAIL RELAY SERVER

(75) Inventors: Masafumi Kinoshita, Sagamihara (JP); Toshiyuki Kamiya, Yokohama (JP); Takafumi Koike, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 804 days.

(21) Appl. No.: 12/787,079

(22) Filed: May 25, 2010

(65) Prior Publication Data

US 2010/0306329 A1    Dec. 2, 2010

(30) Foreign Application Priority Data

May 26, 2009    (JP) ................................. 2009-125961

(51) Int. Cl.
*G06F 15/16*    (2006.01)

(52) U.S. Cl.
USPC ......................................... 709/206; 709/203

(58) Field of Classification Search
None
See application file for complete search history.

(56) References Cited

U.S. PATENT DOCUMENTS

| | | | | |
|---|---|---|---|---|
| 6,449,658 | B1 * | 9/2002 | Lafe et al. ..................... | 709/247 |
| 6,775,026 | B1 * | 8/2004 | Kato ............................. | 358/1.15 |
| 7,023,974 | B1 * | 4/2006 | Brannam et al. ............ | 379/93.24 |
| 7,024,460 | B2 * | 4/2006 | Koopmas et al. ............. | 709/206 |
| 7,031,314 | B2 * | 4/2006 | Craig et al. ................... | 370/392 |
| 7,089,286 | B1 * | 8/2006 | Malik ........................... | 709/206 |
| 7,111,039 | B2 * | 9/2006 | Warren et al. ................ | 709/206 |
| 7,136,897 | B1 * | 11/2006 | Raghunandan .............. | 709/206 |
| 7,360,096 | B2 * | 4/2008 | Bracewell et al. ........... | 713/183 |
| 7,444,381 | B2 * | 10/2008 | Malik ........................... | 709/206 |
| 7,451,180 | B2 * | 11/2008 | Warren et al. ................ | 709/203 |
| 7,552,182 | B2 * | 6/2009 | Raghunandan .............. | 709/206 |
| 7,814,162 | B2 * | 10/2010 | Raghunandan .............. | 709/206 |
| 7,836,099 | B2 * | 11/2010 | Ravikumar et al. .......... | 707/803 |
| 7,930,357 | B2 * | 4/2011 | Malik ........................... | 709/206 |
| 7,945,504 | B1 * | 5/2011 | Lloyd et al. .................... | 705/37 |
| 2003/0028606 | A1 * | 2/2003 | Koopmans et al. .......... | 709/206 |
| 2003/0048751 | A1 * | 3/2003 | Han et al. ..................... | 370/231 |
| 2003/0053448 | A1 * | 3/2003 | Craig et al. ................... | 370/353 |
| 2004/0098495 | A1 * | 5/2004 | Warren et al. ................ | 709/230 |
| 2004/0098609 | A1 * | 5/2004 | Bracewell et al. ........... | 713/200 |

(Continued)

FOREIGN PATENT DOCUMENTS

| | | |
|---|---|---|
| EP | 1 798 929 A1 | 6/2007 |
| JP | 08-331173 | 12/1996 |
| WO | WO 01/37516 A2 | 5/2001 |

OTHER PUBLICATIONS

European Search Report issued in European Patent Application No. 10005461.8-2416, mailed Aug. 16, 2010.

*Primary Examiner* — Ninos Donabed
(74) *Attorney, Agent, or Firm* — McDermott Will & Emery, LLP

(57) ABSTRACT

To solve the problem with mobile phone carriers that increasing mail traffic increases storage capacity of a mail server and network load, a relay server which relays a mail transfer (SMTP communication) and a mail fetch (IMAP communication) is installed in a carrier facility network. The relay server compresses a mail including a header transferred from a mail transfer server, adds a new header to encapsulate the mail, and transmits the encapsulated mail to an IMAP server as a compressed mail. In response to a mail fetch request from a communication terminal, the relay server decapsulates and restores the compressed mail fetched from the IMAP server, and transmits the restored mail to the communication terminal. The relay server changes parameters such as the mail size, so that no inconsistency of IMAP commands occurs in compressing/restoring the mail.

6 Claims, 9 Drawing Sheets

(56) References Cited

U.S. PATENT DOCUMENTS

| | | | |
|---|---|---|---|
| 2005/0044158 A1* | 2/2005 | Malik | 709/206 |
| 2006/0256721 A1* | 11/2006 | Yarlagadda et al. | 370/235 |
| 2006/0265510 A1* | 11/2006 | Warren et al. | 709/230 |
| 2007/0043866 A1* | 2/2007 | Garbow et al. | 709/226 |
| 2007/0211713 A1* | 9/2007 | Koshino et al. | 370/389 |
| 2008/0109820 A1* | 5/2008 | Raghunandan | 719/313 |
| 2009/0049150 A1* | 2/2009 | Malik | 709/206 |
| 2013/0054396 A1* | 2/2013 | Goldfinger et al. | 705/21 |

\* cited by examiner

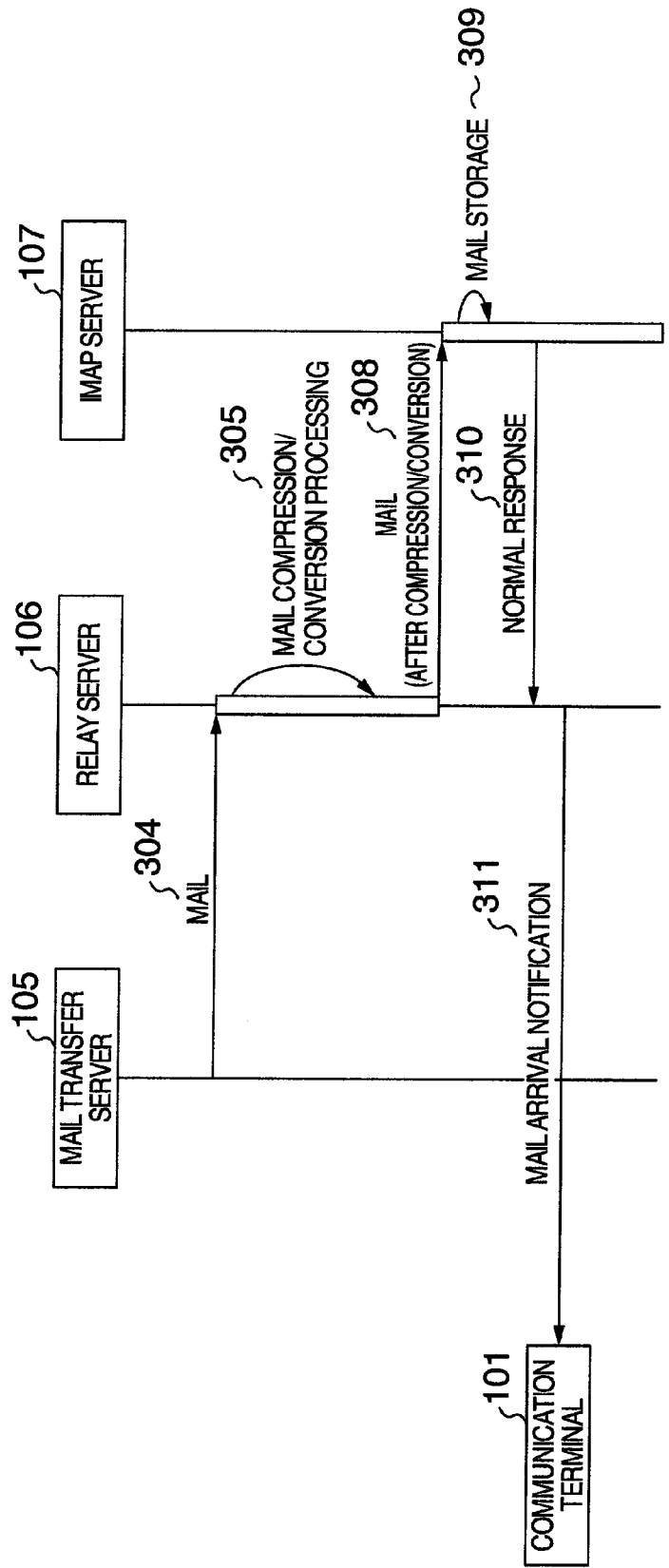

FIG. 4

Return-Path: <xxxxx@hitachi.com> ~401
Received: from aaa.hoge.co.jp
Received: from bbb.hoge.co.jp
(OMITTED) ~402
Received: from eee. hoge.co.jp
Message-ID: <111111111 @hoge.co.jp> ~403
Message-Type: Multiple Part ~404
Content-Type: multipart/mixed; boundary="---zzz" ~405
To: <aaaaa@hoge.com> ~406
From: <mailer@hoge.com> ~407
Date: Thu, 16 Oct 2008 15:38:32 +0900 ~408
Subject: =?ISO-2022-JP?B? ~409
X-xxxx(GROUP OF EXTENSION HEADERS) ~410

(GROUP OF OTHER HEADERS, OMITTED)

~411

(MAIL BODY)

Received: from imap.hoge.com ..... ~710
Content-Type: RS_archive1; ~502
To: <aaaaa@hoge.com> ~406
From: <mailer@hoge.com> ~407
Date: Thu, 16 Oct 2008 15:38:32 +0900 ~408
Subject: =?ISO-2022-JP?B?Rnc6GyRCVobKEJBUkIFUvsKQiFbPTUbKEI=?= ~409
Message-ID: <1111111111@hoge.co.jp. Msize2600,900> ~507

~611

(COMPRESSED MAIL DATA)

~709

MAIL RELAY SERVER

This application claims priority based on a Japanese patent application, No. 2009-125961 filed on May 26, 2009, the entire contents of which are incorporated herein by reference.

BACKGROUND

The present invention relates to a mail relay method.

As electronic mails of mobile phones are becoming more popular, networks (called "carrier facility networks") and a group of mail servers handle a lot of mail traffic, which are managed by a company (called a "mobile phone carrier") providing a mobile phone communication service. Recently, attached files such as an image file and an audio file tend to increase the mail size, and it is expected that the traffic will increase more. Because of the background described above, a mobile phone carrier has problems of the mail server storage capacity and the network load.

There is a technology disclosed in JP-A-08-331173 as a method for reducing the mail server storage capacity and the network load. The technology disclosed in JP-A-08-331173 is as follows: the transmitting side, before sending an electronic mail, checks whether or not the receiving side can uncompress a compressed electronic mail, and, if the receiving side can do, sends the electronic mail including a compressed mail body.

The method described above attempts to solve the problem of an electronic mail system which transmits the electronic mail without compressing data as it is, that is, the problem that the communication cost is high and the communication line is congested in the case of a large amount of data.

SUMMARY

The method disclosed in JP-A-08-331173 is considered effective especially in a mail including a large mail body such as a mail including an attached file. In general, the mail body transmitted over the Internet is converted to 7-bit data format such as Base64. Because the amount of data converted to this format is about 1.3 times larger than that of the original data, the compression effect is considered to be very high.

However, it is difficult to achieve applying the technology disclosed in JP-A-08-331173 to the mail system of the mobile phone carrier, because a terminal need to install a mail program compliant with compression and uncompression or decompression (hereinafter, uncompression or decompression being called "restoration").

As a method to compress and restore a mail without installing a mail program compliant with compression/restoration on a communication terminal, it is considered to install a relay server relaying mails. That is, the relay server compresses a received mail from a communication terminal, and relays the compressed mail to a mail server, and the relay server restores the compressed mail which is fetched from the mail server and transmits the restored mail to the communication terminal.

However, the protocol such as IMAP used by a mobile phone to fetch mails requires that a communication terminal performs the processing for fetching the information such as the mail size before fetching a mail. Therefore, if the relay server simply compresses and restores the mail, communication inconsistency occurs and the mail cannot be fetched.

JP-A-08-331173 discloses the technology to compress the mail body, but not the information part including the destination information and the like (paragraphs [0040]-[0043]). However, a short mail communicated by a communication terminal such as a mobile phone includes a larger mail header than the mail body in many cases, and so compressing only the mail body provides little effect. Therefore, the method described in JP-A-08-331173 is not very effective.

A relay server and a relay method are provided to solve the problems described above. That is, a relay server is provided for a large mail system of a mobile phone carrier and the like to make it possible to reduce the storage capacity and the load of the carrier facility network without the need to install a new program in a communication terminal.

Specifically, the disclosed relay server is installed in a carrier facility network to relay SMTP (Simple Mail Transfer Protocol) communication for transferring a mail and IMAP (Internet Message Access Protocol) communication for fetching a mail.

Specifically, the relay server receives and compresses a standard mail to be transferred from a mail transfer server to an IMAP server, adds to the mail after compression, information on the compression such as the mail sizes before and after compression and the compression format, and transmits the compressed mail to the IMAP server (mailbox). When compressing the mail, the relay server compresses not only the mail body but also the mail header. In addition, the relay server adds information to the original mail header or changes the parameters such as the mail size so that no inconsistency of the IMAP commands occurs when compressing the mail.

In addition, the relay server relays mail communication between a communication terminal and the IMAP server. Specifically, the relay server relays to the IMAP server, an envelope information fetch request, a mail size fetch request, and a mail fetch request which are received from a communication terminal. Furthermore, based on a response received from the IMAP server, the relay server creates envelope information, calculates the mail size after restoration, or restores a compressed mail which has been fetched, to create a response to the request from the communication terminal and transmit the response to the communication terminal.

Specifically, a relay server is connected to a mail management server that saves mails and, in response to a request from a communication terminal, delivers a mail for the communication terminal, to a mail transfer server, and to the communication terminal, characterized in that the relay server
receives a mail from the mail transfer server;
if it is judged that a compression effect of the received mail exceeds a predetermined value,
compresses the mail including a mail body and a mail header to create a body of a compressed mail,
creates a header of the compressed mail including compression information on the compression and information included in the mail header, and
transmits to the mail management server the compressed mail including the header of the compressed mail and the body of the compressed mail, to make the management server save the compressed mail; or
if it is judged that the compression effect is equal to or lower than the predetermined value,
transmits the received mail to the mail management server, to make the management server save the received mail.

The relay server may, when creating the header of the compressed mail, selects from the information included in the mail header, information including Message-ID to be included in the header of the compressed mail; and
add the size of the body of the compressed mail to the Message-ID as the compression information.

The relay server may also, when receiving a request relating to a mail saved in the mail management server from the communication terminal, analyze the request and converts the request according to the analysis result;

transmit the converted request to the mail management server; and receive from the mail management server as a response to the converted request, information relating to the mail for the communication terminal.

The relay server may also, based on the analysis result and the received information relating to the mail, create a response to the received request from the communication terminal; and transmit the created response to the communication terminal.

The relay server may, (a) if the analysis result indicates that the received request from the communication terminal is a mail size fetch requests, select an IMAP command "fetch all", (b) if the analysis result indicates that the received request from the communication terminal is a request to fetch or analyze a part of mail data, select an IMAP command "fetch rfc822" to fetch a whole mail, or (c) if the analysis result indicates neither the above (a) nor (b), select the received request from the communication terminal; and transmit the selected request to the mail management server as the converted request.

The relay server may also add header items which are included in the header of the compressed mail received as a response and which are added by the mail management server, to the mail header of the restored mail;

if the request is a mail header fetch command, extracts the mail header to which the items are added, or if the request is a body structure fetch command, analyze the mail body structure of the mail; and creates the response.

The relay server may also, if the received information relating to the mail is information relating to the compressed mail and a response to the request from the communication terminal need to include a mail size, obtain the compression information from the received information relating to the compressed mail; and calculate a mail size before compression based on the compression information to make the calculated mail size included in the response to the communication terminal.

In many cases, a standard relay server is installed between the mail transfer server and the IMAP server. In these cases, the problems described above can be solved by adding the disclosed function to the relay server already installed.

Because there is no need to alter the terminal side, the relay server is applicable not only to mobile terminals but also to general communication terminals.

According to the teaching herein, the storage capacity and the network load of a carrier facility network can be reduced without altering terminals and existing servers in a large mail system.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 3 is a diagram showing an example of the mail storage sequence.

FIG. 4 is a diagram showing a content example of mail data that the relay server 106 receives from a communication terminal 101.

FIG. 7 is a diagram showing a content example of mail data that the relay server 106 receives from the IMAP server 107.

DESCRIPTION OF THE EMBODIMENTS

Embodiments of the present invention will be described below with reference to the drawings.

Figure 1:
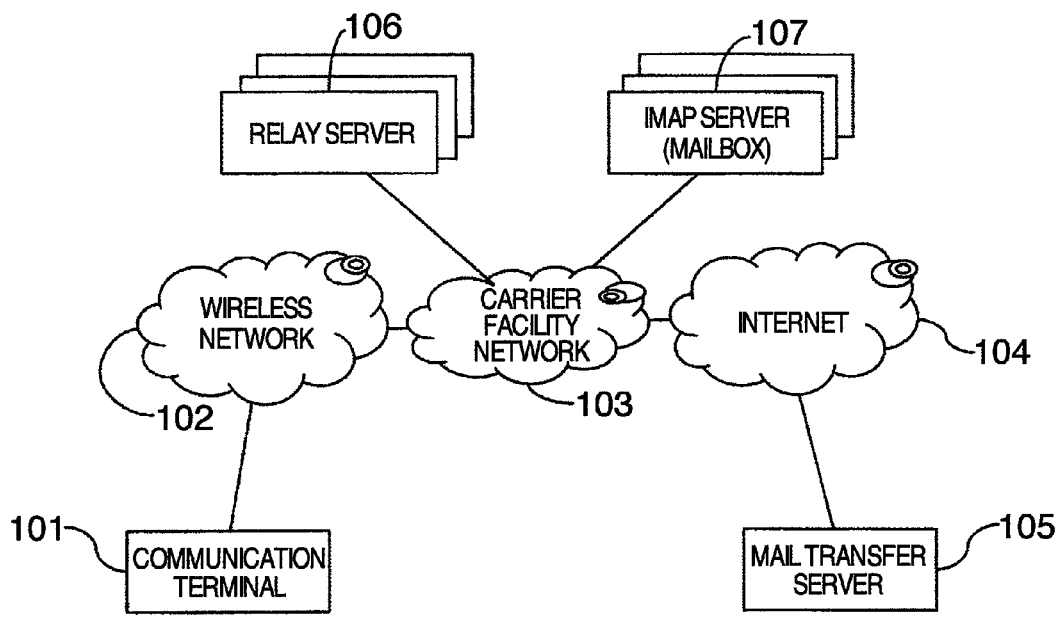
FIG. 1 is a diagram showing a configuration example of a system in this embodiment.

FIG. 1 shows a configuration example of the system. In this figure, reference numeral 101 denotes a communication terminal, reference numeral 102 denotes a wireless network, reference numeral 103 denotes a carrier facility network, reference numeral 104 denotes a network such as the Internet, reference numeral 105 denotes a mail transfer server, reference numeral 106 denotes a relay server, and reference numeral 107 denotes a mail management server such as an IMAP server (hereinafter called an "IMAP server"). At least the relay server 106 and the IMAP server 107 are connected via a network capable of 8-bit data communication.

The communication terminal 101 is a terminal device such as a mobile phone terminal or a PC capable of data communication, and is connected to the carrier facility network 103 via the wireless network 102. The wireless network 102 is a wireless network managed by a mobile phone carrier. The carrier facility network 103 is a network and its facility which convert or relay the communication from the wireless network 102 to the Internet 104, relay server 106, and IMAP server 107. The wireless network 102 and the carrier facility network 103 are managed by the mobile phone carrier that manages the relay server 106 in this embodiment. The mail transfer server 105, also called an "MTA (Message Transfer Agent)", transfers a received mail from other mobile phone carriers and the like via the Internet 104, to the IMAP server 107 as a destination.

This embodiment illustrates the case where a mail is transmitted from the Internet 104 to the communication terminal 101 that belongs to the carrier facility network 103. Note that a mail is transmitted also from another communication terminal included in the carrier facility network 103 to the communication terminal 101 (that is, the mail is transmitted and received within the carrier facility network 103). Although the mail transfer server of that case is installed not in the Internet 104 but in the carrier facility network 103, the sequence is the same and thus the description is omitted in this embodiment.

The IMAP server 107 is installed in the carrier facility network 103, stores a mail to be transmitted to the communication terminal 101, and delivers it to the communication terminal 101 via the IMAP. Although a large mail system of the mobile phone carrier and the like is composed of multiple IMAP servers 107 for storing a large amount of mail, this embodiment illustrates one IMAP server for simplicity.

Although it is assumed that a mailbox is the IMAP server in this embodiment, an MMS (Multimedia Messaging Service) server can also substitute for the IMAP server 107.

The relay server 106 is installed in the carrier facility network 103, receives a mail that the mail transfer server 105 transmits to the carrier facility network 103, and relays it to the IMAP server 107. The relay server 106 also relays the delivery sequence for a series of mails (IMAP communication) between the IMAP server 107 and the communication terminal 101. Although this embodiment illustrates one relay server 106 for simplicity, the system comprises have multiple relay servers 106 to distribute the load of mail traffic.

A mail gateway or the relay server 106 that is functionally called "MTA", "MSA (Mail Submission Agent)" or the like is conventionally installed in some standard large mail systems. Assuming such a case, the system in this embodiment comprises the relay server 106 which has the existing mail relay function as well as the function to implement this embodiment.

Figure 2:
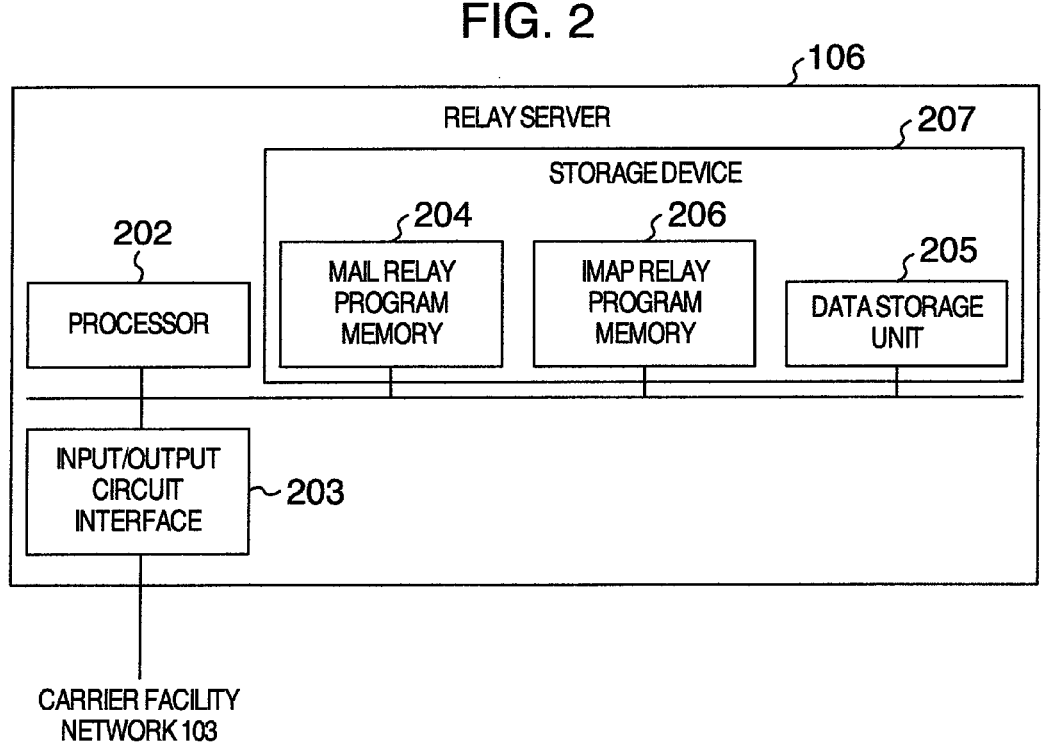
FIG. 2 is a diagram showing a configuration example of a relay server 106 in this embodiment.

FIG. 2 shows the hardware configuration of an information processing device to implement the relay server 106. The information processing device to implement the relay server 106 comprises a processor 202, a storage device 207, an input/output circuit interface 203 for transmitting/receiving data to/from the carrier facility network 103, and internal communication lines such as the bus for connecting these.

The storage device 207 is configured by a semiconductor storage device or an external storage device such as a hard disk. The storage device 207 comprises a mail relay program memory 204, an IMAP relay program memory 206, and a data storage unit 205. The mail relay program memory 204 stores various types of control programs implementing the processing for the relay server 106 receiving a mail from the mail transfer server 105 to relay it to the IMAP server 107. The IMAP relay program memory 206 stores various types of control programs implementing the processing for the relay server 106 relaying the IMAP communication between the IMAP server 107 and the communication terminal 101. The respective programs described above are executed by the processor 202. The program memories 204 and 206 also store data used by the programs.

The respective programs may be stored in advance in the program memories 204 and 206, or may be read into the program memories 204 and 206 via a removable recording medium or a communication medium not shown in the figure (that is, a network, or the digital signal or carrier wave propagating on the network). The data storage unit 205 stores information other than information stored in the respective program memories 204 and 206.

FIG. 3 is a diagram showing an example of the mail storage sequence. This figure shows the sequence by which the relay server 106 receives a mail from the mail transfer server 105 and the IMAP server 107 stores it. Although SMTP, ESMTP (Extended SMTP), LMTP (Local Mail Transfer Protocol), and HTTP (Hypertext Transfer Protocol) are assumed as the mail storage protocol in this embodiment, any other protocols capable of transmitting mail data may be used in this embodiment.

First, the mail transfer server 105 transmits a mail 304 to the relay server 106. Next, the relay server 106 performs the mail compression/conversion processing 305 to reduce the mail capacity (hereinafter, mail compression/conversion processing 305 to reduce the mail capacity being called simply the "compression/conversion", or "compression", the details of which will be shown in FIG. 8). Next, the relay server 106 transmits a compressed/converted mail 308 to the IMAP server 107. Next, the IMAP server 107 performs the mail storage processing 309. Next, the IMAP server 107 transmits a normal response 310 to the relay server 106. Last, the relay server 106 transmits a mail arrival notification 311 to the communication terminal 101.

FIG. 4 is a diagram showing an example of data of the mail 304 that the relay server 106 receives from the mail transfer server 105. This figure shows the configuration and the content of standard mail data exchanged between communication terminals, wherein reference numeral 411 denotes a mail header and reference numeral 412 denotes a mail body. The mail header 411 is composed of a group of the following header items: Return-Path 401, Received 402, Message-ID 403, Message-Type 404, Content-Type 405, To 406, From 407, Date 408, Subject 409, and an extension 410 beginning with X.

Received 402 is a header item added by each server such as the mail transfer server that has relayed the mail. Message-ID 403 is an identifier such that the mail source or the server that has relayed the mail can uniquely identify the mail. To 406 and From 407 indicate the mail addressees of the mail destination and mail source, respectively. Subject 409 indicates the subject of the mail. The mail body 412 is composed of a mail body, files attached to the mail and the like, each which is configured as a MIME (Multipurpose Internet Mail Extension) part. In a standard mail, an MIME part is encoded as 7-bit data such as the Base64.

Figure 5:
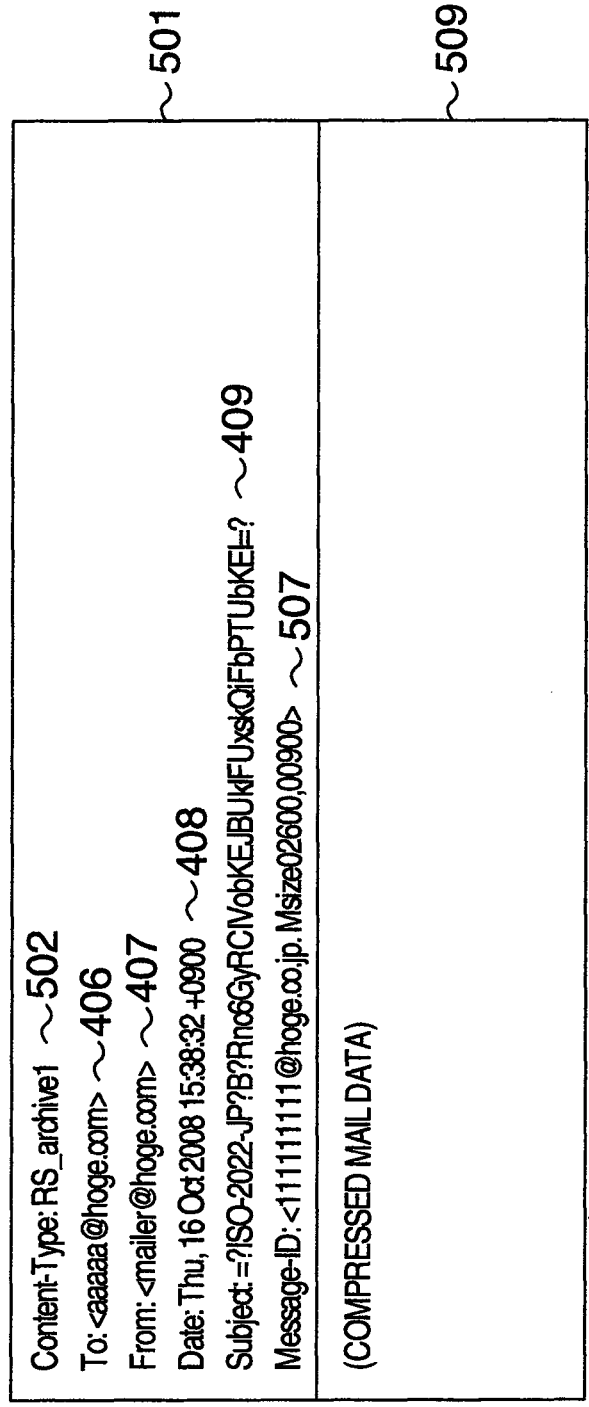
FIG. 5 is a diagram showing a content example of mail data that the relay server 106 transmits to an IMAP server 107.

FIG. 5 is a diagram showing an example of data of the mail 308 that the relay server 106 transmits to the IMAP server 107. In this figure, reference numeral 501 denotes a mail header and reference numeral 509 denotes a mail body. The configuration of the mail header 501 is determined during the processing 305 performed by the relay server 106, and the header item types and the processing method indicated therein vary according to the setting of the relay server 106 (the details of which will be shown in FIGS. 8). To 406, From 407, Date 408, and Subject 409 are the same as those in FIG. 4, and other header items are changed or created by the relay server 106 during the processing 305.

Content-type 502 indicates the compression format of the mail body 509. Message-ID 507 includes the Message-ID 403 and the additional information immediately following thereto and indicating the respective mail sizes of the mail 304 and of the mail 308 received and transmitted by the relay server 106 (hereinafter, this information being called the "mail size information"). Here, it is indicated that the mail size of the mail 304 before compression is 2600 bytes and the mail size of the mail 308 after compression is 900 bytes. The mail size information, though added in this embodiment to Message-ID that is a header item included in the information called the envelope of IMAP (the details of which will be shown in FIG. 6), may be added to any other header item.

The information added by the relay server 106 to the header need not be character information but may be in the binary form to reduce the data amount. The mail body 509 is composed of the mail header 411 and the mail body 412 of the mail 304 to be compressed which are compressed together.

Figure 6:
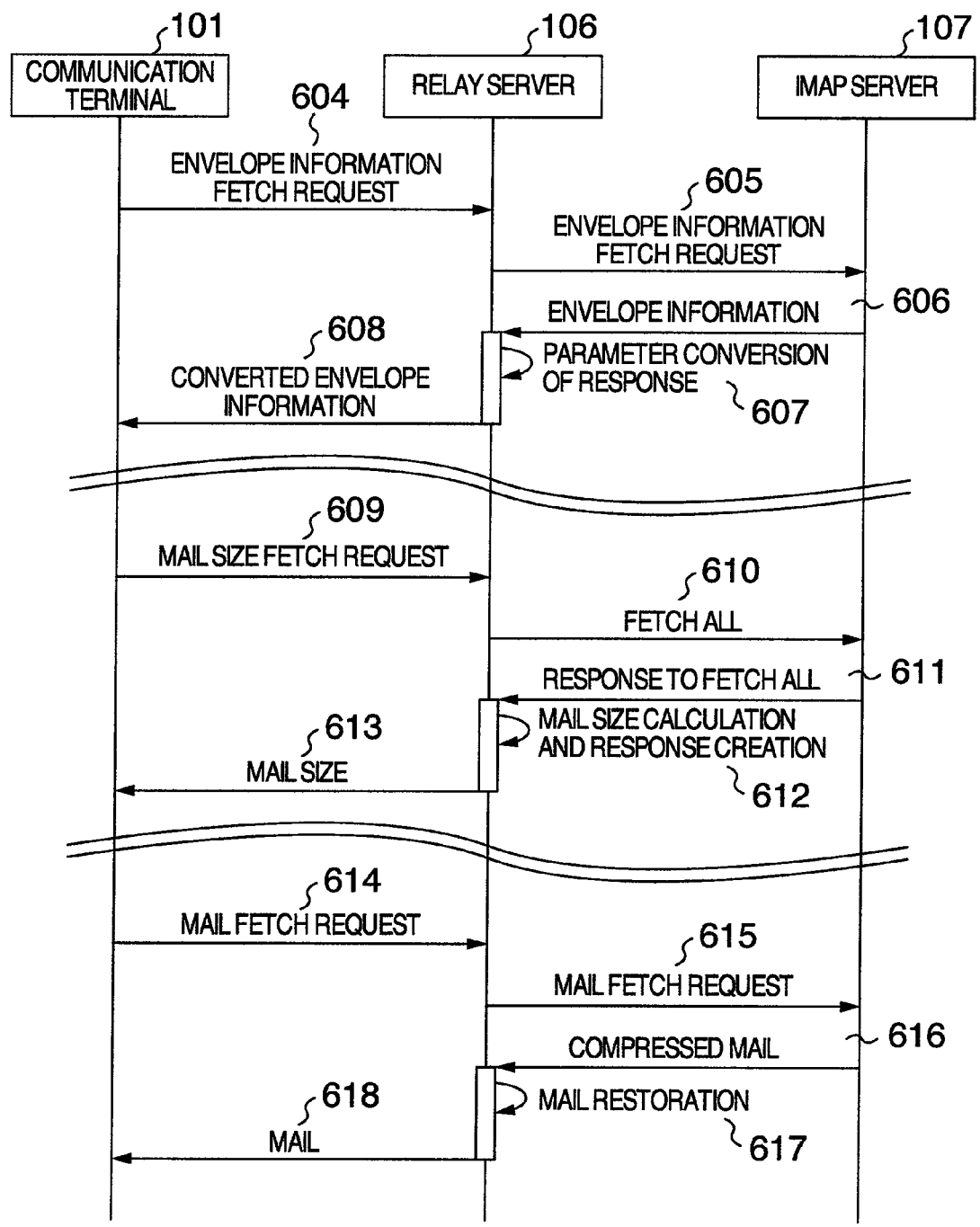
FIG. 6 is a diagram showing an example of the IMAP communication sequence.

FIG. 6 is a diagram showing a communication sequence for the communication terminal 101 and the IMAP server 107 exchanging an IMAP command via the relay server 106. Below, the notation of the IMAP command is as follows. When the same processing content is included in multiple commands, the command name representing the processing content is defined in this embodiment, and the representative command of the multiple IMAP commands is expressed in parentheses "( )". For example, because the mail size fetch processing is included both in "fetch rfc822.size" which is an IMAP command to fetch only the mail size and in "fetch fast"

which is a command combining "fetch rfc822.size" and two other commands "fetch flags" and "fetch internaldate", the command indicating this processing is defined as "mail size fetch request (fetch rfc822.size)". However, "fetch rfc822.size" is included also in "fetch all" which is a compound combining two commands "fetch fast" and "fetch envelope" and in "fetch full" which is a command combining two commands "fetch all" and "fetch body". Because both of these include the "fetch envelope" command, they are defined as an envelope information fetch request that will be described later. In addition, a command that can be represented by one IMAP command is expressed with the command name.

FIG. 6 shows three IMAP processing sequences: envelope information fetch, mail size fetch, and mail fetch (which do not need to be executed sequentially but may be executed independently).

The IMAP server 107 need to authenticate the communication terminal 101 (login) and select the mailbox before these sequences, which is omitted in FIG. 6 for simplicity. The sequences shown in FIG. 6 are processed similarly also in the case where IMAP can perform the processing for multiple mails with one command.

The envelope information is the information indicating mail structure defined via IMAP, and includes the header items such as Data, Subject, From, Sender, Reply-To, To, Cc, Bcc, In-Reply-To, and Message-ID. The envelope information can be fetched together during the "envelope information fetch" processing. Further, adding the mail size information to a header item such as Message-ID as shown in FIG. 5, makes it possible to fetch the mail size information together when fetching the envelope information, which is efficient.

The envelope information fetch sequence will be described.

In the envelope information fetch sequence, the communication terminal 101 first transmits an envelope information fetch request 604 to the relay server 106. As the command capable of envelope information fetch request, there are "fetch envelope" which is a command to fetch only the envelope information, and "fetch all" and "fetch full" which are compound commands that include "fetch envelope". Here, the command is denoted as "envelope information fetch request (fetch envelope)" according to the notation described above.

The relay server 106 transmits an envelope information fetch request (fetch envelope) 605 to the IMAP server 107, and the IMAP server 107 transmits as a response to the request, the envelope information 606 to the relay server 106.

The relay server 106 performs parameter conversion processing 607 of the parameters in the envelope information 606 (the details of which will be shown in FIG. 10) to generate converted envelope information 608.

The relay server 106 transmits the converted envelope information 608 to the communication terminal 101.

The mail size fetch sequence will be described.

In the mail size fetch sequence, the communication terminal 101 first transmits a mail size fetch request 609 to the relay server 106. As the commands capable of mail size fetch request, there are "fetch rfc822.size" and the compound command "fetch fast" which includes "fetch rfc822.size", but the mail size fetch request does not include "fetch all" and "fetch full" included in the envelope information fetch request. Here, the command is denoted as "mail size fetch request (fetch rfc822.size)" 609. The relay server 106 transmits "fetch all" 610 to the IMAP server 107. Next, the IMAP server 107 transmits a response 611 to "fetch all" including the mail envelope information and the mail size information, to the relay server 106. Next, the relay server 106 performs processing 612 for calculating the mail size based on the mail size information included in the response 611 to "fetch all" (the details of which will be shown in FIG. 10). Next, the relay server 106 transmits the calculated mail size 613 to the communication terminal 101.

In the mail fetch sequence, the communication terminal 101 first transmits a mail fetch request 614 to the relay server 106. As the commands capable of mail fetch request, there are "fetch rfc822" which fetches a mail and the compound command "fetch all" and "fetch fast" including "fetch rfc822". Here, the command is denoted as "mail fetch request (fetch rfc822)" 614. The relay server 106 transmits a mail fetch request 615 to the IMAP server 107, and the IMAP server 107 transmits as a response to the request, a compressed mail 616 to the relay server 106. The relay server 106 performs the mail restoration processing 617 for the received compressed mail 616. Last, the relay server 106 transmits the restored mail 618 to the communication terminal 101.

Unlike the mail fetch request to fetch one whole mail, there is a request to fetch a part of mail data although not shown in FIG. 6, for example the fetch command to fetch only the mail header (fetch rfc822.header), or the request to analyze mail data, for example the fetch command to fetch the body structure (fetch rfc822.body). The processing sequence for those requests may be implemented in the same way as the mail fetch sequence by means of the relay server 106 fetching the whole compressed mail 616 and restoring the mail data 617 and then performing additional processing for the restored mail.

Although FIG. 6 illustrates IMAP commands, the concept of this embodiment is applicable also to the case of MMS in the same manner as the case of IMAP by using the sequence for converting the mail size information.

FIG. 7 is a diagram showing an example of data of the compressed mail 616 that the relay server 106 receives from the IMAP server 107. The data of the compressed mail 616 is composed of a mail header 611 and a mail body 709. To 406, From 407, Date 408, Subject 409, and Message-ID 507 of the mail header 611 and mail body 709 are the same as those in FIG. 5. Among other header items, Content-Type 502 is a header item created by the IMAP server 107 either during the mail storage processing 309 or during the processing before transmitting the compressed mail 616. Received 710 is a header item added by the IMAP server 107. In addition to the items described above, there are header items created or changed by the IMAP server 107 depending upon the specification of the IMAP server 107, but the description is omitted here.

Figure 8:
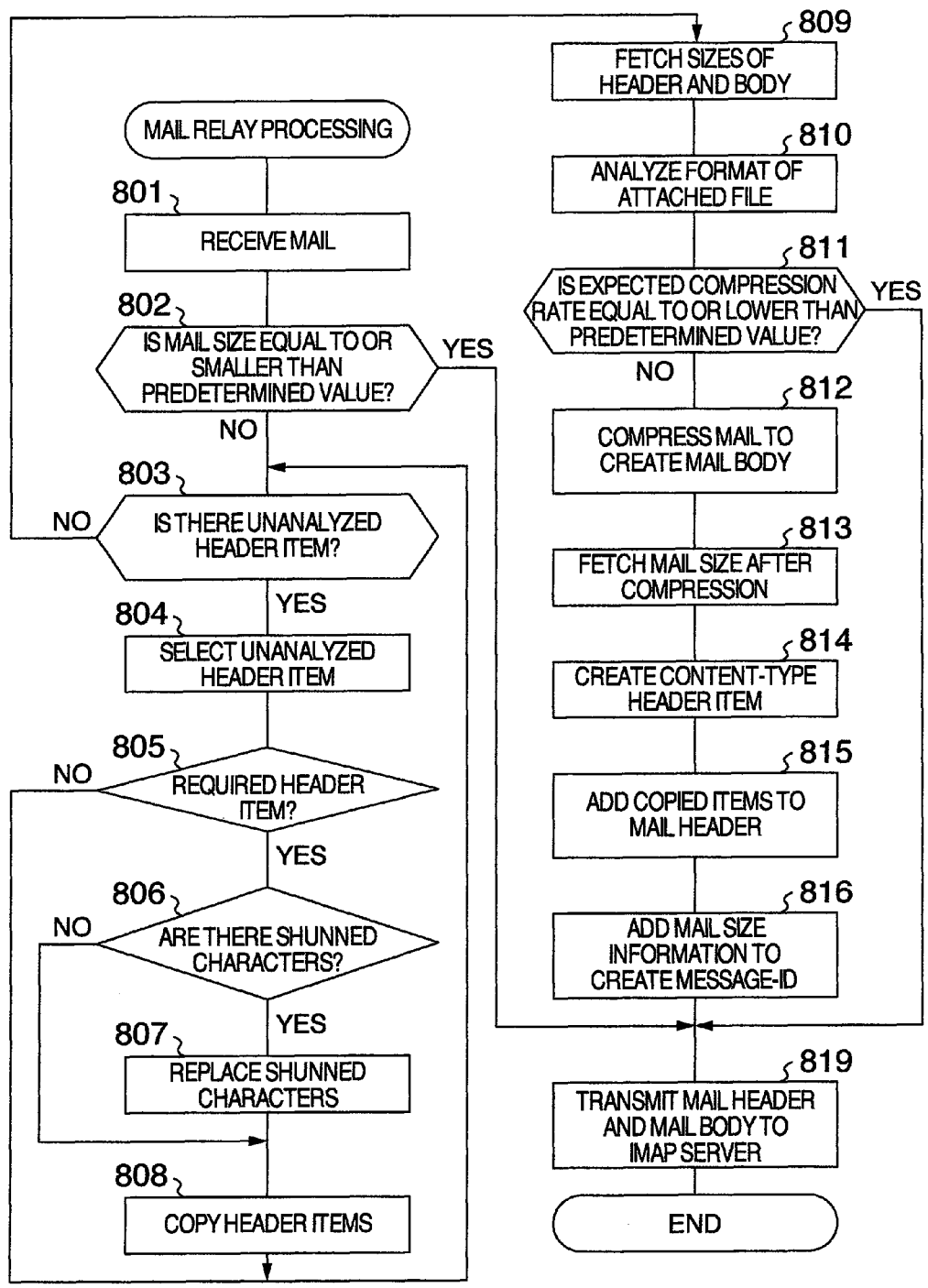
FIG. 8 is a diagram showing an example of the processing flow for relaying mail in the relay server 106.

FIG. 8 is a processing flow at the time when the relay server 106 relays a mail from the mail transfer server 105 to the IMAP server 107 (hereinafter, a sequence of processing performed by the relay server 106 being called "mail relay processing"). This processing flow is implemented by the processor 202 executing the program in the mail relay program memory 204 shown in FIG. 2.

Step 801 is the processing for receiving the mail 304 from the mail transfer server 105.

Step 802 is the processing for checking whether or not the mail size of the mail 304 is equal to or smaller than a predetermined value. If the mail size is equal to or smaller than the predetermined value, the compression processing is omitted because the compression effect is little, and step 819 is executed next; if the mail size exceeds the predetermined value, step 803 is executed next. Step 803 is the processing checking whether or not the mail 304 includes any unanalyzed header items. If there is an unanalyzed header item, step 804 is executed next; otherwise, step 809 is executed next.

Step 804 is the processing for selecting an unanalyzed header item and performing the processing of steps 805 to 808 for the selected header item. Step 805 is the processing for checking whether or not the selected header item is a required header item. If the selected header item is a required item, step 806 is executed next; if it is not a required item, step 803 is executed again.

Required header items are header items which the relay server 106 adds to the header of the compressed mail 308, specifically, ones in the IMAP envelope information and ones determined as required according to the protocol specification such as SMTP, LMTP, or ESTMP, and the specification of the IMAP server 107 and the like. In this embodiment, required header items are the header items required as the IMAP envelope information such as Date, Subject, From, Sender, To, Cc, Bcc, In-Reply-To, and Message-ID. The items indicated in the mail header 501 in FIG. 5 are required header items in this embodiment.

Step 806 is the processing for checking whether or not there are shunned characters in the selected header item. If there are shunned characters, step 807 is executed next; otherwise, step 808 is executed next. As described below, shunned characters are a character string that makes the relay server 106 unable to properly perform the compression/conversion processing for reducing the mail capacity (specifically, compression/conversion processing in steps 812-816, the details of which will be described later).

During the compression/conversion processing, the relay server 106 adds to the mail header, information specific to the relay server 106 as the compression information. If this specific information is leaked, altering header items in a mail from the mail transfer server 105 or the communication terminal 101 can cause the relay server 106 to interpret an uncompressed mail as a compressed mail which the relay sever 106 has received from the IMAP server 107, and, as a result, make the system malfunction to affect it. To prevent this, when receiving a mail to be transmitted to the IMAP server 107, the relay server 106 performs the shunned character processing for a character string corresponding to the specific information already added.

Step 807 is the shunned character processing for enclosing shunned characters with special characters, or for replacing shunned characters with other characters.

Step 808 is the processing for copying the selected header items in the data storage unit 205 to create the compressed mail 308.

Step 809 is the processing for fetching the sizes of the mail header 411 and the mail body 412 to be compressed.

Step 810 is the processing for analyzing the format of an attached file included in the mail body 412, specifically, for analyzing the MIME header, determining the types such as character string, image, and audio, for respective MIME parts of the mail, and analyzing the data compression format and their data sizes.

Step 811 is the processing for checking whether or not the expected compression rate after the compression/conversion processing, is equal to or lower than a predetermined value based on the data fetched in steps 809 and 810. Specifically, based on a group of data, compression formats, and sizes fetched in steps 809 and 810, as well as the corresponding expected compression rate pre-set in the relay server 106, the expected mail body size after compression/conversion is calculated. Based on the expected mail body size and the received mail 304, the expected compression rate is calculated. The expected mail body size is an approximate size obtained by a simple calculation carried out before compression/conversion, and the accurate size after compression/conversion is calculated in steps 812 to 816.

If the expected compression rate is equal to or lower than the predetermined value in step 811, step 819 is executed next; otherwise, step 812 is executed next.

Steps 812 to 816 are the compression/conversion processing. Step 812 is the processing for compressing the whole received mail 304 to create the mail body 509. The compression algorithm is determined according to the combination of the data format fetched in step 810 and the setting in the relay server 106.

Because the network connecting the relay server 106 and the IMAP server 107 can communicate 8-bit data as described above, the compression processing may be the processing for decoding the data converted to 7-bit data format such as Base64 into the original data format (in this case, the compressed data being 0.75 times larger than the data before compression).

Step 813 is the processing for fetching the mail size after compression. Step 814 is the processing for creating the header item Content-type 502 which includes the mail compression format.

Step 815 is the processing for adding the selected header items copied in step 808, to a new mail header 501.

Step 816 is the processing for adding the mail size information before and after compression to Message-ID 403, to create Message-ID 507 as shown in FIG. 5.

Step 819 is the processing for transmitting the compressed mail 308 which includes the mail header 501 and the mail body 509, to the IMAP server 107.

Figure 9:
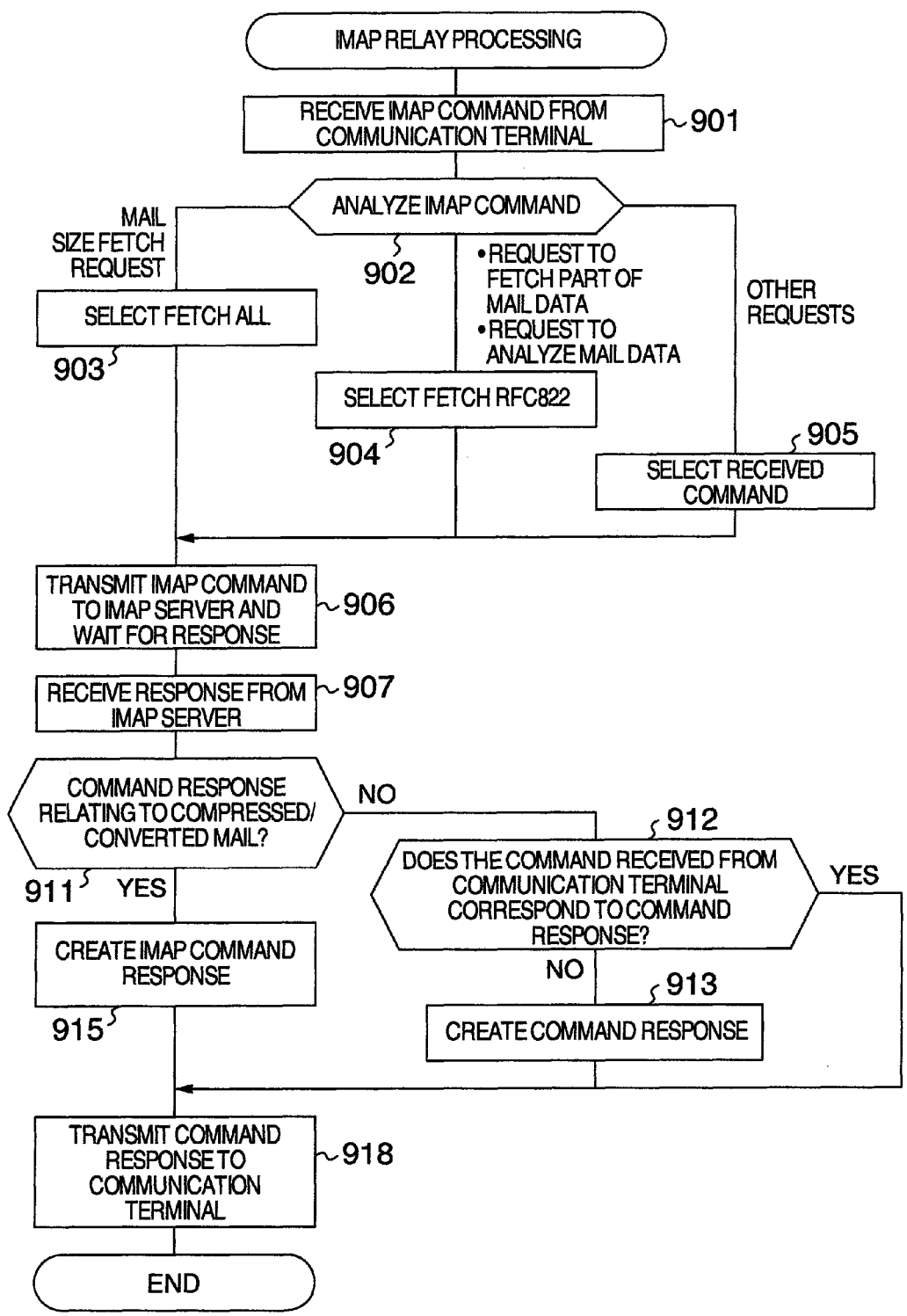
FIG. 9 is a diagram showing an example of the processing flow for relaying IMAP in the relay server 106.

FIG. 9 is a processing flow for, when the relay server 106 analyzes an IMAP command received from the communication terminal 101, converts and transmits the analyzed command to an IMAP command to be transmitted to the IMAP server 107, creating a response to be transmitted to the communication terminal, based on the response received from the IMAP server 107. This processing flow is implemented by the processor 202 executing the program in the IMAP relay program memory 206.

In this embodiment, the relay server 106 creates a new compressed header when creating a compressed mail, and the IMAP server 107 stores both the mail which is compressed and the mail which is not compressed. To properly handle those headers, the relay server 106 converts the IMAP commands as described below.

Step 901 is the processing for receiving an IMAP command from the communication terminal 101. Step 902 is the processing for analyzing the received command. If the received command is a mail size fetch request (fetch rfc822.size), step 903 is executed next; if the received command is a request to fetch or analyze a part of mail data such as a mail header fetch command (fetch rfc822.header) or the body structure fetch command (fetch rfc822.body), step 904 is executed next; if the received command is other than those commands, step 905 is executed next.

Step 903 is the processing for selecting "fetch all" instead of the received mail size fetch request (fetch rfc822.size), as the processing for converting to a command to be transmitted to the IMAP server 107. Step 904 is the processing for selecting "fetch rfc822" to fetch the whole mail instead of the received request to fetch or analyze a part of received mail data, as the similar conversion processing. Step 905 is the processing for selecting the received command itself as a command to be transmitted to the IMAP server 107, as the conversion processing, if the received IMAP command is none of the above both.

Step 906 is the processing for transmitting the IMAP command selected in any of step 903, 904, or 905, to the IMAP server 107, and putting into the response wait state. Step 907 is the processing for receiving a response from the IMAP server 107. This response is a response (hereinafter called a "command response") to the IMAP command transmitted by the relay server 106 in step 906. The processing flow in FIG. 9 is executed for each IMAP command, and the transmitted IMAP command and the command response can be associated by means of an identifier called the "IMAP command tag".

Step 911 is the processing for determining whether or not the received response is a command response relating to a compressed mail. That is, due to no compression or other reasons during the corresponding mail relay processing (for example, Yes in step 811 in FIG. 8), mails which are compressed by the relay server 106 and mails which are not compressed are mixed together in the IMAP server 107. The processing of step 911 is required to handle such case. In step 911, it is determined based on whether or not the command response includes the mail size information added by the relay server 106, or on Content-Type 502. In step 911, if the received response is a command response of a compressed mail, step 915 is executed next; otherwise, step 912 is executed next.

Step 912 is the processing for determining whether or not the command received from the communication terminal 101 corresponds to the command response from the IMAP server 107. If it does, step 918 is executed next because the command response can be transmitted as the response to the communication terminal 101 as it is; if it does not, step 913 is executed next. For example, in FIG. 6, it is determined that it does, if the relay server 106 receives an envelope information fetch request from the communication terminal 101, and then receives the envelope information from the IMAP server 107; it is determined that it does not, if a command response to "fetch all" is received responsive to the mail size fetch request from the communication terminal 101.

Step 913 is the processing for creating a command response according to the command received from the communication terminal 101. For example, if a command response to "fetch all" is received responsive to the mail size fetch request from the communication terminal 101, the relay server 106 obtains the mail size from the command response to "fetch all" to create the command response to the mail size fetch request.

Step 915 is the processing for, if the response received from the IMAP server 107 is a command response of a compressed mail, creating an IMAP command response to be transmitted from the relay server 106 to the communication terminal 101 (hereinafter called the "IMAP command response creation processing"). The IMAP command response creation processing will be described in detail with reference to FIG. 10. Step 918 is the processing for transmitting the command response created in the above step 913 or step 915 by the relay server 106, to the communication terminal 101.

Figure 10:
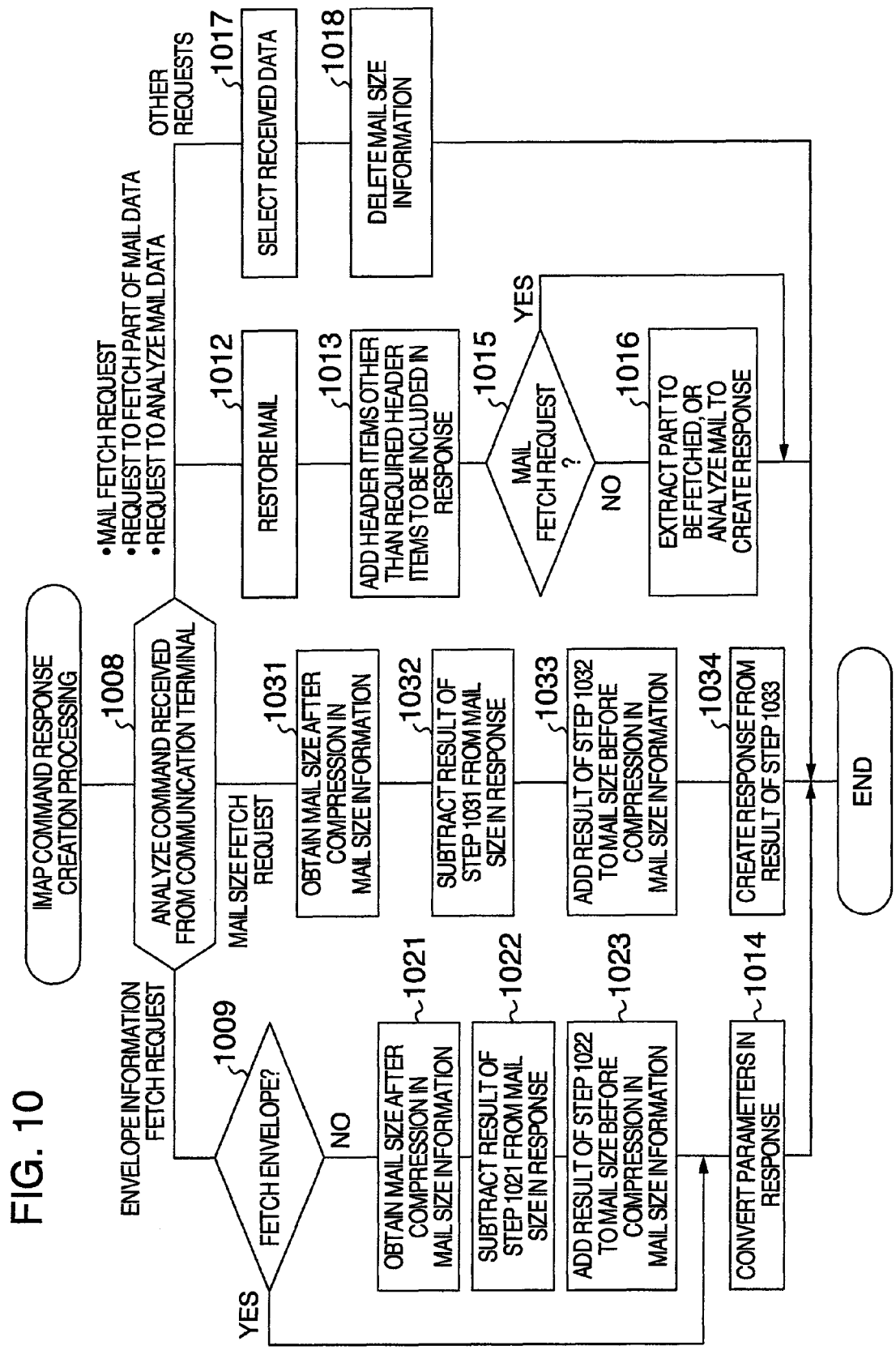
FIG. 10 is a diagram showing an example of the processing flow for creating the IMAP command response in the relay server 106.

FIG. 10 shows the detailed flow of the IMAP command response creation processing by the relay server 106 shown in step 915 in FIG. 9. Similarly to FIG. 9, the processing is implemented by the processor 202 executing the program in the IMAP relay program memory 206. Step 1008 is the processing for analyzing the IMAP command already received from the communication terminal 101 in step 901. It may also refer to the analysis result in step 902 in FIG. 9. If the IMAP command is an envelope information request, step 1009 is executed next; if the IMAP command is a mail size fetch request, step 1031 is executed next; if the IMAP command is a mail fetch request or a request to fetch or analyze a part of mail data, step 1012 is executed next; or if the IMAP command is other than the above requests, step 1017 is executed next.

Step 1009 is the processing for determining whether or not the IMAP command which is received from the communication terminal 101 and which includes the envelope-information, is "fetch envelope", or another command such as "fetch all" or "fetch full". Although the envelope information is included in a response to any of these IMAP commands, it is necessary not to include the mail size in the corresponding command response, if the IMAP command is "fetch envelope", but to include the mail size in the corresponding command response, if the IMAP command is "fetch all", "fetch full" or the like. Therefore, if the IMAP command is "fetch envelope", the mail size does not need to be included and so step 1014 is executed next; otherwise, step 1021 is executed next.

Step 1021 is the processing for obtaining the mail size after compression in the mail size information included in Message-ID in the envelope information in the command response received from the IMAP server 107. Because the relay server 106 performs the mail compression/conversion processing, the mail size included in the command response differs from the actual mail size. Consequently, the actual mail size is calculated in steps 1021 to 1023 based on the mail size information included in the command response. Step 1022 is the processing for calculating the size of the mail header added by the IMAP server 107, by subtracting the result of step 1021 from the mail size included in the command response.

Step 1023 is the processing for adding the result of step 1022 to the mail size before compression included in the mail size information, that is, adding the size of the mail header added by the IMAP server 107, to the mail size after restoration, and for calculating the size of the actual mail that the communication terminal 101 can fetch using the mail fetch request. Step 1014 is the processing for converting the parameters in the response.

Specifically, the step is the processing for deleting the mail size information from Message-ID, and for, if the IMAP command is not "fetch envelope", replacing the mail size with the mail size calculated in step 1011.

In steps 1031 to 1033 which are the same as steps 1021 to 1023, the actual mail size is calculated based the mail size information included in the command response. Step 1034 is the processing for creating a command response to the mail size fetch request using the mail size calculated in step 1033.

Step 1012 is the processing for restoring the mail body in the command response to create a mail. This step is the processing for determining the mail compression format based on Content-Type 502 in the command response to restore the mail compressed in step 812. Step 1013 is the processing for adding the header items other than required header items included in the mail header in the command response, to the header of the mail restored in step 1012. Here, the header items other than required header items are header items such as Received 710, created by the IMAP server 107 either during the mail storage processing 309 or during transmitting the compressed mail 616. Step 1015 is the processing for determining whether or not the IMAP command already analyzed in step 1008 is a mail fetch request. If the analyzed IMAP command is a mail fetch request, no more processing is performed; otherwise, that is, if the analyzed IMAP command is a request to fetch or analyze a part of mail data, step 1016 is executed next.

Step 1016 is the processing for extracting from the restored mail a part to be fetched or for analyzing the restored mail to create a response, for example, if the analysis result is the mail header fetch command (fetch rfc822.header), the processing for extracting only the mail header from the mail for which the processing in step 1013 is completed; if the analysis result is the body structure fetch command (fetch rfc822.body), the processing for analyzing the mail body structure of the mail for which the processing in step 1013 is completed, to create a response,.

Step 1017 is the processing for performing no more processing for the received command response, and step 1018 is the processing for deleting the mail size information included in the command response.

Although the relay server 106 has both the mail relay processing function shown in FIG. 8 and the IMAP relay processing function shown in FIG. 9 in this embodiment, the same effect as that of this embodiment may be achieved by two relay servers each of which implements one of those different functions. In such a configuration, the relay server having the mail relay processing function relays the mail storage protocol communication such as SMTP, ESMTP, or LMTP, and the relay server having the IMAP relay processing function relays the IMAP communication.

The specification and drawings are, accordingly, to be regarded in an illustrative rather than a restrictive sense. It will, however, be evident that various modifications and changes may be made thereto without departing from the spirit and scope of the invention as set forth in the claims.

The invention claimed is:

1. A relay server connected to a mail management server that saves mails for saving and, in response to a request from a communication terminal, delivers a mail for the communication terminal, to a mail transfer server, and to the communication terminal, the relay server comprising a processor and a non-transitory storage unit storing a mail relay program, wherein the mail relay program, when executed by the processor, causes the relay server:
to receive a mail from the mail transfer server;
after receiving the mail, to judge whether a compression effect of the received mail exceeds a predetermined value, or equal to or lower than the predetermined value;
when it is judged that the compression effect of the received mail exceeds the predetermined value, to compress the received mail including a mail body and a mail header to create a body of a mail for saving, to create a header of the mail for saving including compression information on the compression and information included in the mail header of the received mail, and to transmit to the mail management server the mail for saving including the header of the mail for saving and the body of the mail for saving, to make the management server save the mail for saving; and
when it is judged that the compression effect is equal to or lower than the predetermined value, to transmit the received mail to the mail management server, so as to make the management server save the received mail without compressing the received mail as a mail for saving,
wherein the mail relay program, when executed by the processor, further causes the relay server, when receiving a request relating to a mail saved in the mail management server from the communication terminal:
to analyze the request and converts the request according to an analysis result of the request so as to be able to properly respond to the request;
to transmit the converted request to the mail management server;
to receive from the mail management server as a response to the converted request, information relating to the mail for the communication terminal;
to create, based on the analysis result and the received information relating to the mail, the response to the received request from the communication terminal; and
to transmit the created response to the communication terminal,
wherein the mail relay program, when executed by the processor, further causes the relay server, if the received information relating to the mail relates to the mail for saving, and the analysis result indicates that the request is a mail fetch request, a request to fetch a part of mail data, or a request to analyze mail data:
to restore the received mail before being compressed, by decompressing the body of the mail for saving saved in the mail management server; and
based on the restored mail and the analysis result, to create a response to the received request from the communication terminal, and
wherein the mail relay program, when executed by the processor, further causes the relay server:
to add header items which are included in the header of the mail for saving received as a response and which are added by the mail management server, to a mail header of the restored mail;
to perform, if the request is a mail header fetch command, extracting a mail header to which the items are added, or if the request is a body structure fetch command, analyzing the mail body structure of the mail; and
to create the response.

2. The relay server according to claim 1, wherein the mail relay program, when executed by the processor, further causes the relay server, when creating the header of the mail for saving:
to select from the information included in the mail header of the received mail, information including Message-ID to be included in the header of the mail for saving; and
to add the size of the body of the mail for saving to the Message-ID as the compression information.

3. The relay server according to claim 1 wherein the mail relay program, when executed by the processor, further causes the relay server:
to perform:
(a) if the analysis result indicates that the received request from the communication terminal is a mail size fetch request, selecting an IMAP command "fetch all",
(b) if the analysis result indicates that the received request from the communication terminal is a request to fetch or analyze a part of mail data, selecting an IMAP command "fetch rfc822" to fetch a whole mail, or
(c) if the analysis result indicates neither the above (a) nor (b), selecting the received request from the communication terminal; and
to transmit the selected request to the mail management server as the converted request.

4. The relay server according to claim 1, wherein the mail relay program, when executed by the processor, further causes the relay server, if the received information relating to the mail is information relating to the mail for saving and a response to the request from the communication terminal needs to include a mail size:

to obtain the compression information from the received information relating to the mail for saving; and to calculate a mail size before compression based on the compression information to make the calculated mail size included in the response to the communication terminal.

5. The relay server according to claim 1, wherein the mail relay program, when executed by the processor, further causes the relay server, if the received information relating to the mail is information relating to a mail which is not compressed and is not a response to the request from the communication terminal, to create a response to the request from the communication terminal based on the received information relating to the mail.

6. The relay server according to claim 1, wherein the mail relay program, when executed by the processor, further causes the relay server, if the mail header of the received mail has included a shunned character string to be included in the compression information, to replace the shunned character string with another predetermined character string or to enclose the shunned character string with predetermined characters.

\* \* \* \* \*